PULSED CARRIER RADIO BEACON TRANSMITTER

Filed April 10, 1964 2 Sheets-Sheet 1

INVENTORS
KENNETH F. BORNHORST
EDWARD L. GLIATTI &
WILLIAM L. COLELLO

BY Louis A Kline
Richard G. Stahr

THEIR ATTORNEYS

PULSED CARRIER RADIO BEACON TRANSMITTER

Filed April 10, 1964 2 Sheets-Sheet 2

INVENTORS
KENNETH F. BORNHORST
EDWARD L. GLIATTI &
WILLIAM L. COLELLO

BY Louis A Kline
Richard G. Stahr
THEIR ATTORNEYS

United States Patent Office 3,299,356
Patented Jan. 17, 1967

3,299,356
PULSED CARRIER RADIO BEACON TRANSMITTER

Kenneth F. Bornhorst and Edward L. Gliatti, Dayton, and William L. Colello, Troy, Ohio, assignors to The National Cash Register Company, Dayton, Ohio, a corporation of Maryland Filed Apr. 10, 1964, Ser. No. 358,781
5 Claims. (Cl. 325—105)

Figure 1:
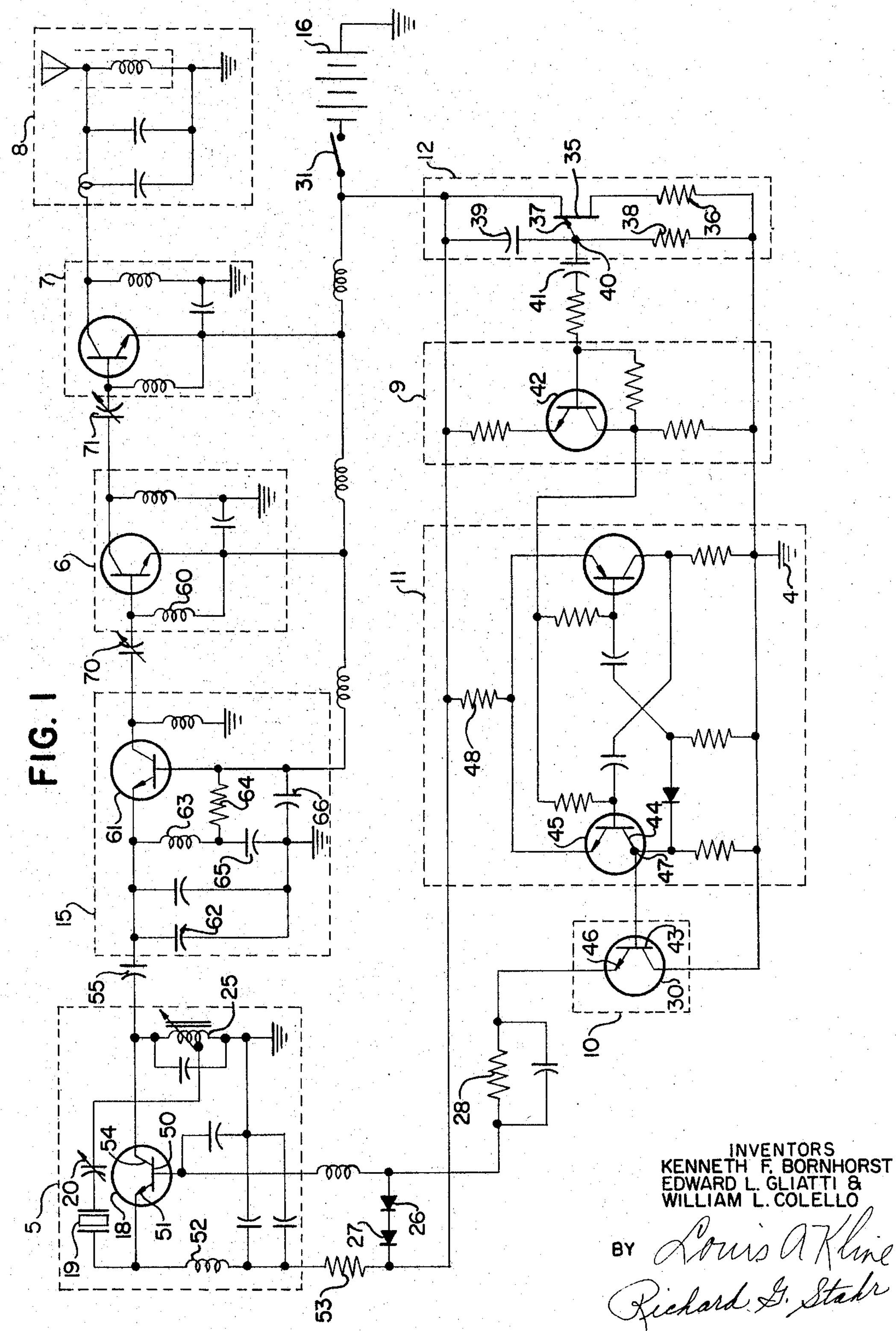

The present invention relates to Radio Beacon Transmitters and, more specifically, to Radio Beacon Transmitters of the pulsed carrier type.

Recently, there has been considerable activity in the development of a small, light, compact, and efficient unit which is easily carried, and which, when activated will transmit a radio signal. By means of a search vehicle equipped with a receiver which is tuned to the frequency of the radio beacon transmitter, lost persons, weather buoys, etc., may be located. After the radio beacon has been received, the search for the missing person is effected through direction-finding techniques well known in the search and rescue field.

Because the search area may be quite vast, it is important that the radio beacon transmitters be not only highly efficient but also of such a design as to conserve the electrical supply energy.

Since the person or persons who are lost may be injured, it is important that the radio beacon transmitter be self-contained and self-keyed for operations of this type.

It is, therefore, an object of this invention to provide an improved radio beacon transmitter.

It is another object of this invention to provide an improved radio beacon transmitter which is self-keyed.

It is an additional object of this invention to provide an improved radio beacon transmitter which self-keys the carrier signal over a short-duty cycle to obtain maximum efficiency of the power supply.

In accordance with this invention, a fully transistorized pulsed carrier radio beacon transmitter is provided, wherein the radio frequency oscillator circuit is keyed by a modulator circuit, the "on" time of which is determined by a modulator control circuit comprising a variable-frequency oscillator of the type which oscillates at a frequency determined by the potential level of a linearly-variable potential signal applied to its input circuitry whereby the carrier signal is transmitted in pulses.

For a better understanding of the present invention, together with further objects, advantages, and features thereof, reference is made to the following description and accompanying drawing.

Referring to the drawing, each stage of the radio beacon transmitter of this invention is shown within a respective dashed-line rectangle. These various stages include a transistorized radio frequency oscillator stage 5, a modulator circuit 10 for keying the oscillator stage, a modulator circuit control circuit 11, a frequency determining potential signal generating circuit 12, a transistorized frequency doubler circuit 15, two transistorized radio frequency amplifier circuits 6 and 7, an antenna and antenna matching network 8, and an impedance matching interstage 9. To supply direct current power, a battery 16, schematically represented by the conventional battery symbol, may be used. Throughout the drawing, all points of reference potential or "ground" are referenced by the numeral 4.

To provide the radio frequency carrier signal, any conventional radio frequency oscillator may be employed. To realize a high degree of frequency stabilization in a practical application of the beacon transmitter of this invention, a transistorized, crystal controlled radio frequency oscillator as schematically set forth in detail within the dashed-line rectangle 5 was employed. The amplifier device is a type NPN transistor 18, having the usual base, emitter, and collector electrodes, and the frequency-determining element is a conventional crystal 19 included in the feedback loop.

The transistor 18 was operated with a grounded base configuration, as shown, to provide low input impedance at the low signal level of the crystal 19. The capacitor 20, in series with the crystal 19, is adjusted to produce zero degree phase shift around the feedback loop. The tank coil 25 is tapped to provide unity loop gain feedback through the crystal 19. With this arrangement in the practical application, the oscillator 5 operated at a collector efficiency of approximately 35% and produced an output of approximately 80 milliwatts, with a frequency stability of approximately .0025% from −30 degrees centigrade to +55 degrees centigrade, and over a power supply potential range of 2.5:1. This remarkable stability of the oscillator frequency is realized through the unique biasing arrangement for the base electrode of the oscillator transistor 18.

To maintain a substantially constant base-emitter bias potential upon the oscillator transistor 18, the series combination of a resistor 28 and series diodes 26 and 27, connected between the point of reference potential 4 and the negative terminal of the battery 16 is employed. The diodes 26 and 27 are operated at or near saturation; therefore, the voltage drop thereacross changes very slightly with changes of source potential. Previously, an expensive Zener diode was employed to stabilze oscillator frequency with varying direct current power source potential, a method which wasted power. It was found in the practical application that this base-emitter biasing arrangement resulted in less than a one-milliampere change in collector current over a 2:1 range of source potential magnitudes.

The transmitted beacon signal of the circuit of this invention is modulated by "chopping" or pulsing the carrier signal. One method of doing this is by keying the radio frequency oscillator 5 "on" and "off."

To key the radio frequency oscillator 5 "on" and "off," a modulator circuit composed of a conventional transistor device having the usual base, emitter, and collector electrodes connected as an electronic switch, as shown within the dashed-like rectangle 10, may be employed. The emitter-collector circuit of a modulator transistor 30 is connected in series with the base electrode of the oscillator transistor 18 and the source of direct current potenial 16 through the point of reference potential 4. With the modulator transistor 30 not conducting, the battery is removed from the oscillator circuit as the return circuit through "ground" is interrupted. Therefore, to key the radio frequency oscillator 5 "on" and "off," the modulator transistor 30 must be conducting and not conducting, respectively. As the modulator transistor 30 is shown to be a type NPN transistor, the collector electrode is connected to the point of reference potential 4, in this circuitry positive, and the emitter electrode is connected to the negative terminal of the battery 16 through the resistor 28, the diodes 26 and 27, and the conventional, mechanically-operated electrical switch 31, as shown. As this arrangement places a forward base-emitter bias upon a type NPN transistor, the modulator transistor 30 may be rendered conducting or not conducting by biasing the base electrode in a manner to be explained later.

So that the audible signal produced upon the detection of the transmitted pulsed carrier will be of a distinctive tone, a series of intervals during which the modulator circuit 10 keys the radio frequency oscillator 5 "on" is repeated during repeating regular periods, with the time duration of each interval within any period being different from that of the next succeeding interval.

A modulator circuit control circuit, as schematically set forth within the dashed-line rectangle 11, is included to determine the "on" time of the modulator circuit and, therefore, the intervals during which the modulator circuit 10 keys the radio frequency oscillator circuit 5 "on." This modulator control circuit may be a conventional, variable-frequency, free-running multivibrator device of the type which oscillates at a frequency determined by the magnitude of a potential signal applied to its input circuitry.

To produce the frequency-determining potential signal for the modulator controller circuit and to establish the repeating regular periods for the series of intervals during which the modulator circuit 10 keys the radio frequency oscillator circuit 5 "on," a potential-signal-generating circuit for repeatedly producing a periodic, substantially linearly variable potential signal, the magnitude of which changes substantially linearly over each period, is employed. The circuit used with the practical application of the beacon transmitter of this invention is schematically set forth within the dashed-line rectangle 12.

The potential-signal-generating circuit 12 is self-starting and free-running and comprises a unijunction-type transistor 35 connected across the source of potential 16 through a resistor 36. The control electrode 37 of the unijunction transistor 35 is connected to the junction point of the series combination of a resistor 38 and a capacitor 39 connected across the potential source 16. As the power is initially turned on by closing the switch 31, the unijunction transistor 35 is non-conductive, and, therefore, a charging circuit, which may be traced from the negative terminal of the source 16 through the capacitor 39 and the resistor 38 to the point of reference potential 4, is established for the capacitor 39. When the direct current potential charge upon the capacitor 39 reaches a magnitude of sufficient level to trigger the unijunction transistor 35 through its control electrode 37, the unijunction transistor 35 conducts, thereby establishing a discharge path for the capacitor 39, which may be traced through the resistor 38, the resistor 36, and the conducting unijunction transistor 35. When the potential or charge upon the capacitor 39 is sufficiently dissipated, the unijunction transistor 35 again becomes non-conductive and re-establishes a charging circuit for the capacitor 39, as previously described. Through the operation of this circuitry, therefore, a sawtooth-type substantially linearly variable potential signal is produced at the point 40, as shown. That is, the potential at the point 40, which is the charge upon the capacitor 39, increases in magnitude, from substantially ground potential, in a positive direction until it is of a sufficient level to trigger the unijunction transistor 35, at which time the capacitor 39 is substantially instantaneously discharged through the conducting unijunction transistor 35, thereby substantially instantaneously reducing the potential at the point 40 from a positive valve to substantially ground. With the potential at the point 40 substantially ground, the unijunction transistor 35 is biased non-conductive, and the capicator 39 again begins charging through the circuit previously described until the charge level reaches a magnitude of sufficient level to again trigger the unijunction transistor 35. From this description, it is apparent that this linearly variable potential-generating circuit is self-starting and repeatedly produces a periodic, substantially linearly variable, potential signal. Although the charge upon the capacitor 39 increases exponentially, the circuit elements are such that only the initial substantially linear portion is used. Typically, this generating circuit oscillates at a few cycles per second.

The potential signal appearing at the point 40 may be coupled, through a capacitor 41, to the interstage 9, which may be a conventional transistor-type inverter, as herein shown, or a conventional transistor emitter follower circuit, or directly to the input circuitry of the modulator control circuit 11.

In the practical application of this device, it was found that the interstage 9 provided a more satisfactory impedance match between the point 40 and the modulator control circuit 11, thereby greatly increasing the allowable frequency swing of the modulator control circuit 11. However, this interstage may be omitted without departing from the spirit of the invention.

The variable-frequency, free-running multivibrator of the modulator control circuit 11 was designed, in the practical application, to have a frequency range of 300 to 1000 cycles per second or 1000 to 300 cycles per second with the linearly-variable potential signal produced by the generating circuit 12 applied to the input circuitry thereof, depending upon whether the interstage 9 is of an emitter-follower configuration or of a phase-inverter configuration. That is, when the linearly-variable potential signal produced by the generating circuit 12 applied to the input circuitry of the modulator control circuit 11 is increasing in a positive direction from substantially ground potential to some positive value, the frequency of the free-running multivibrator varies from 300 cycles per second to 1000 cycles per second, and, when this potential signal is decreasing in the opposite direction from some positive value to ground potential, the frequency of the free-running multivibrator varies from 1000 cycles per second to 300 cycles per second. If the transistor 42 of the interstage 9 is connected in a well-known emitter-follower configuration, the phase of the potential signal appearing at the point 40 is not inverted through the interstage 9, and the potential of this signal applied to the input circuitry of the modulator control circuit 11 increases in magnitude in a positive direction from substantially ground potential. However, should the transistor 42 be connected in a well-known inverter configuration, as shown, the phase of the potential signal appearing at the point 40 is inverted through the interstage 9, and therefore, the potential of this signal applied to the input circuitry of the modulator control circuit 11 decreases in magnitude in the opposite direction from some positive value to substantially ground.

The base electrode 43 of the modulator transistor 30 is connected to the collector electrode 44 of a transistor 45 of the variable-frequency multivibrator of the modulator control circuit 11. As has been brought out previously, the emitter-collector electrodes of the type NPN modulator transistor 30 are forward-biased. Therefore, to bias the transistor 30 to conduction, its base electrode 43 must be biased with a potential more positive than that upon the emitter electrode 46 thereof, and, to bias the transistor 30 to non-conduction, the base electrode 43 must be biased negatively in respect to the emitter electrode 46. With the transistor 45 conducting, the potential at the point 47, which is applied to the base electrode 43 of the modulator transistor 30, is more negative than the potential upon its emitter electrode, as the resistor 48 is of a lower ohmic value of the series combination of the resistor 28 and the diodes 26 and 27. As this does not satisfy the base-emitter bias requirements for conduction through a type NPN transistor, the modulator transistor 30 does not conduct while the transistor 45 of the multivibrator is conducting. With the transistor 45 not conducting, the potential at the point 47 goes positive. As this condition satisfies the base-emitter bias requirements for conduction through a type NPN transistor, the modulator transistor 30 conducts while the transistor 45 of the multivibrator is not conducting.

With the modulator transistor 30 conducting, the "battery" circuit for the radio frequency transistor 18 is established therethrough. The emitter electrode 51 of the radio frequency oscillator transistor 18 is connected to the negative terminal of the battery 16 through a coil 52 and a resistor 53, while its collector electrode 54 is connected to the point of reference potential 4 through the oscillator coil 25, thereby forward-biasing this transistor. Since the conducting transistor 30 establishes the battery circuit for this transistor and the base electrode is biased positive in respect to the emitter through the base bias circuit comprising the diodes 26 and 27 and the resistor 28, a condition which satisfies the base-emitter bias requirements for conduction through a type NPN transistor, the oscillator transistor 18 is conducting during the time that the modulator transistor 30 is conducting.

Since the conducting modulator transistor 30 establishes and the non-conducting modulator transistor 30 interrupts the "battery" circuit for the radio frequency oscillator transistor 18, the modulator circuit 10 "keys" the radio frequency circuit 5 "on" and "off." As has been previously set forth, the time during which the modulator transistor 30 conducts is determined by the time during which the transistor 45 of the variable-frequency multivibrator device of the modulator control circuit 11 is not conducting. Therefore, the modulator control circuit 11 determines the "on" time of the modulator circuit 10 and, therefore, the intervals during which the radio frequency oscillator 5 is keyed "on." The transistor 45 is in the state of non-conduction for the same percentage of the total time of each cycle of the signal produced by the oscillating multivibrator of the modulator control circuit 11. As the frequency of the multivibrator is varied by the frequency-determining potential signal produced by the circuit 12 and applied to the input circuitry of the modulator control circuit 11, the actual time during which the transistor 45 is not conducting is different for each successive cycle of the wave produced thereby. That is, if the frequency of the multivibrator is being increased by the frequency-determining potential signal, the time interval during which the transistor 45 is not conducting becomes shorter with each successive cycle, and, if the frequency of the multivibrator is being decreased by the frequency-determining potential wave, the time interval during which the transistor 45 is not conducting becomes longer with each successive cycle. The frequency-determining potential signal produced by the potential-signal-generating circuit 12 varies substantially linearly in magnitude over a period of time at the end of which the wave is repeated. Therefore, the transmitted pulsed carrier beacon is modulated by the interaction of the circuits 10, 11, and 12, in that the frequency-determining potential-signal-generating circuit 12 establishes a series of repeating regular periods during each of which the modulator control circuit 11 produces a series of intervals, the time duration of each of which is different from that of the next succeeding interval, during which the modulator circuit 10 "keys" the radio frequency oscillator circuit 5 "on."

In the practical application of the circuit of this invention, the multivibrator device of the modulator control circuit 11 was designed in such a manner that its transistor 45 was in a state of non-conduction during approximately 33% of each cycle of the wave produced thereby. With this arrangement, the beacon transmitter is operating only one third of the time. This, of course, results in a very significant reduction of battery drain, therefore allowing the unit of this invention to be operated for a longer period of time without a necessary change of the battery or power source requirements.

It is to be specifically understood that the frequency-determining potential signal may be of another wave form, such as sinusoidal, triangular, or exponential, without departing from the spirit of the invention.

Figure 2:
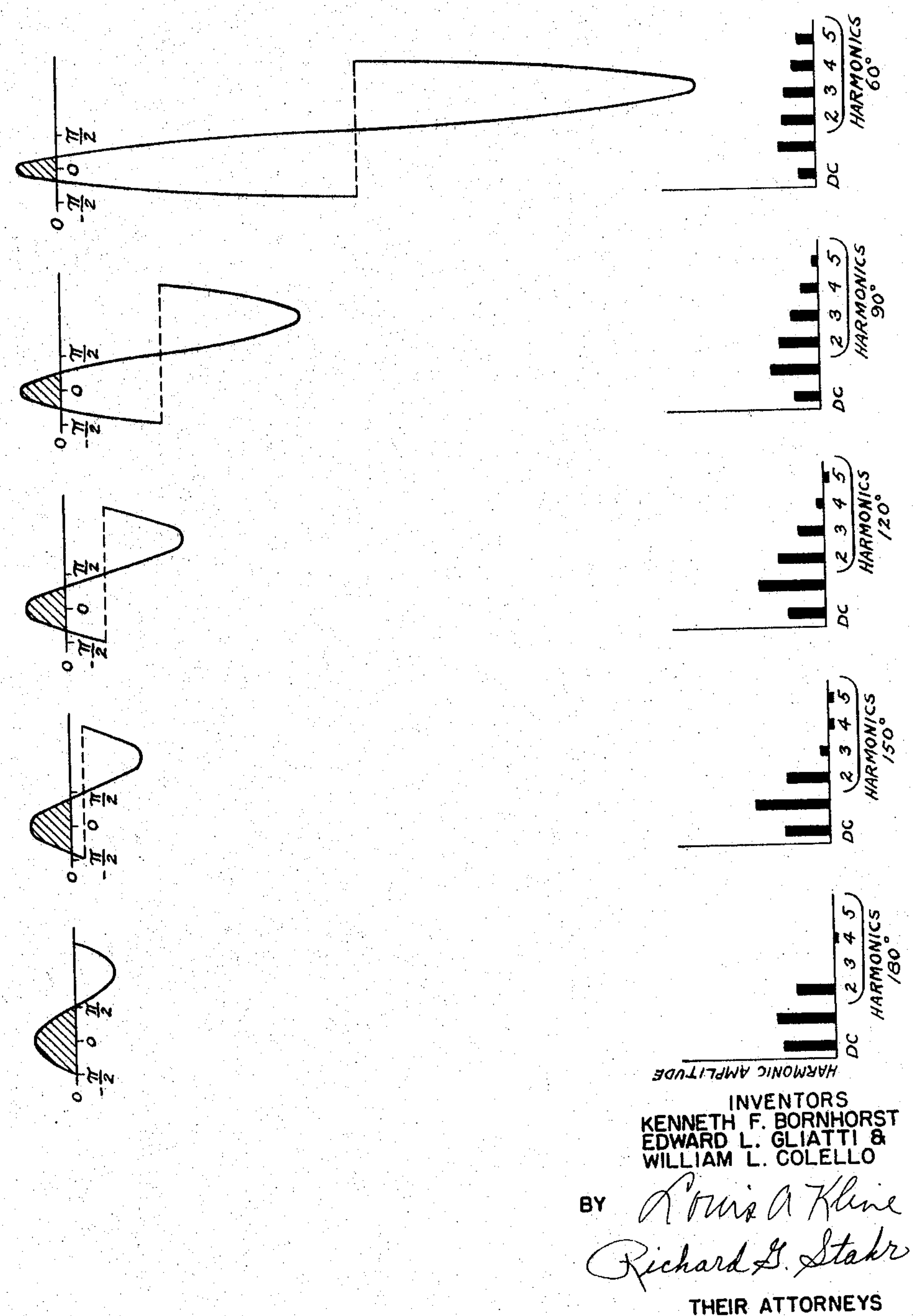

The output of the radio frequency oscillator 5 is coupled to the input circuitry of the frequency doubler circuit 15 through a capacitor 55. The coil 60 is a high Q coil of an inductance value which is tuned to resonate at the second harmonic frequency of the fundamental wave produced by the oscillator 5 by the stray parallel capacity of the circuit. Should the stray circuit capacity be insufficient to tune this coil, the capacitor component may be connected in parallel therewith. The losses which occur within this tuned circuit are made up by a transistor 61 in a manner well known in the art. The capacitor 62 resonates the inductive input component to the fundamental frequency, the coil 63 is a high impedance choke to provide a direct current path between the emitter and collector electrodes of the transistor 61, the resistor 64 is a direct current bias resistor, and the capacitors 65 and 66 are radio frequency by-pass capacitors. The transistor 61 is connected grounded base rather than grounded emitter to provide better isolation and reduced interaction of the input and output frequencies without resorting to traps. With any variable-amplitude input signal wave, it is well known that the portion of the input signal wave translated by a transistor device may be determined by the direct current bias potentials applied thereto. That is, by proper selection of design parameters in respect to the transistor device employed, the transistor may be designed to conduct almost any selected portion of a variable-amplitude input signal wave. Assuming that the signal wave produced by the frequency oscillator 5 is a sinusoidal, the angle of the wave conducted through the transistor 61 may be determined by proper selection of certain design parameters. It has been found that certain conduction angles through a transistor enhances certain harmonic frequencies of the fundamental input signal. In this regard, a conduction angle of approximately 120 degrees of a sine wave produced a maximum enhancement of the second harmonic frequency, the important harmonic in a frequency doubler circuit. FIGURE 2 graphically shows the relationship of harmonic frequency enhancement for conduction angles of 180 degrees, 150 degrees, 120 degrees, 90 degrees, and 60 degrees. The design parameters which optimize the direct current conditions to produce maximum second harmonic enhancement within the circuit of FIGURE 1 are the value of the resistor 64, the choice of the transistor 61, and the value of direct current power supply voltage applied to the stage. With one type of NPN silicon epitaxial transistor having a gain band width of 400 mc. and an output frequency of 250 mc., the most efficient value for the collector supply was 6.5 volts with the resistor 64 adjusted to 100 ohms.

Radio frequency amplifier circuits employed in the practical application of this invention are schematically set forth within the dashed-line rectangles 6 and 7. It is necessary that these circuits be efficient in operation, produce high gain, and introduce a minimum of distortion. The techniques necessary to obtain high gain per stage and high collector efficiency are not well known. Extremely short leads must be employed, power by-passing is very critical and must be essentially a short circuit (0.5 ohm max) at the signal frequency, and low loss impedance must be used for interstage impedance matching. This limits interstage matching to high Q capacitors, as coils, transformers, and tapped coils introduce unsatisfactory losses at the signal frequencies involved in the upper VHF band and the UHF band. Silicon NPN epitaxial planar transistors with wide band widths are required. The power supply or battery efficiency of this unit, which is defined as $$\frac{\text{R.F. power output}}{\text{Battery power input}} = \text{Battery Efficiency}$$

depends largely upon the efficiency of the radio frequency amplifier stages 6 and 7, as these two stages together require the majority of power from the battery. Overall radio transmitter battery efficiencies of 50% to 65% have been obtained, which requires efficiencies of the order of 85% to 90% from stages 6 and 7. Previously, single-stage efficiencies reported in the lateratūre have been in the 60% to 80% region.

The output of the final stage of radio frequency amplification is coupled to an antenna stage which radiates the signal produced by the novel transmitter of this invention.

In the practical application of this invention, adjustable trimmer capacitors of a commercially-available type were selected as coupling capacitors 70 and 71. By employing adjustable coupling capacitors as interstage couplers between the frequency doubler stage and the radio frequency amplifier stages, an extremely low loss impedance match was obtained, thereby increasing the efficiency of this unit.

The high stage efficiency of amplifying stages 6 and 7, the 33% duty cycle, pulsing of the oscillator, providing a high fundamental oscillator frequency to minimize the number of frequency multiplications required, minimizing current drain of the modulator by proper circuit design, and the provision of an oscillator circuit and a doubler circuit of high efficiency result in an optimum state of the art advance in radio frequency power output and battery life for a given size and weight of beacon transmitter and battery. A further advantage of using the pulsed carrier technique is that a receiver not equipped with a beat frequency oscillator may detect and receive the beacon transmission. This technique provides audible modulation with many fewer components than are required by the conventional amplitude modulation technique. Previous attempts at providing 60 to 1200 mc. energy have been to generate high power at the fundamental crystal frequency, then multiply to the desired output frequency with varactor frequency doublers and triplers. This technique is costly not only in regard to battery input power but also in regard to the components involved.

In this specification, to illustrate the operation of the novel pulsed carrier radio beacon transmitter of this invention, specific electrical elements were set forth to provide the radio frequency carrier, the frequency-determining potential signal, and the variable-frequency signal of the modulator control circuit. It is to be specifically understood that these elements are not to be considered limiting, since similar devices which will perform similar functions may be substituted therefor.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. A pulsed carrier radio transmitter beacon comprising a source of direct current potential, a radio frequency oscillator circuit means including output circuit means and an oscillator transistor device having at least base, emitter, and collector electrodes for producing a radio frequency carrier signal, a modulator circuit means comprising a transistor device having at least base, emitter, and collector electrodes, the emitter-collector circuit of which is connected in series with the base electrode of said oscillator transistor and said source of direct current potential for keying said radio frequency oscillator circuit, a modulator circuit control circuit means including input and output circuit means comprising a variable frequency free-running multivibrator device of the type which oscillates at a frequency as determined by the magnitude of the potential signal level applied to said input circuitry thereof for determining the "on" time of said modulator circuit, electrical circuit means for connecting said modulator circuit control circuit output circuit means to the base electrode of said modulator circuit transistor device, potential-signal-generating circuit means including output circuit means fer repeatedly producing a periodic substantially linearly variable potential signal the magnitude of which changes substantially linearly over each period for producing the frequency-determining potential for said modulator circuit control circuit means, electric circuit means for connecting said potential-signal-generating circuit output circuit means to said modulator circuit control circuit input means whereby the frequency of said modulator circuit control circuit multivibrator device is varied over a predetermined range during each period of said substantially linearly variable potential signal, a frequency doubler circuit means, including input and output circuit means, at least one radio frequency amplifier circuit means having input and output circuit means, electrical circuit means for connecting in order said oscillator circuit means, said frequency doubler circuit means, and said radio frequency amplifier circuit means in cascade, and antenna circuit means connected to said output circuit means of the last said radio frequency amplifier stage.

2. A pulsed carrier radio transmitter beacon comprising a source of direct current potential, a radio frequency oscillator circuit means including output circuit means and an oscillator transistor device having at least base, emitter, and collector electrodes for producing a radio frequency carrier signal, means for providing a substantially constant bias potential upon said base electrode, a modulator circuit means comprising a transistor device having at least base, emitter, and collector electrodes, the emitter-collector circuit of which is connected in series with the base electrode of said oscillator transistor and said source of direct current potential for keying said radio frequency oscillator circuit, a modulator circuit control circuit means including input and output circuit means comprising a variable frequency free-running multivibrator device of the type which oscillates at a frequency as determined by the magnitude of the potential signal level applied to said input circuitry thereof for determining the "on" time of said modulator circuit, electrical circuit means for connecting said modulator circuit control circuit output circuit means to the base electrode of said modulator circuit transistor device, potential-signal-generating circuit means including output circuit means fer repeatedly producing a periodic substantially linearly variable potential signal the magnitude of which changes substantially linearly over each period for producing the frequency-determining potential for said modulator circuit control circuit means, electrical circuit means including an impedance matching interstage for connecting said potential-signal-generating circuit output circuit means to said modulator circuit control circuit input circuit means whereby the frequency of said modulator circuit control circuit multivibrator device is varied over a predetermined range during each period of said substantially linearly variable potention signal, a frequency doubler circuit means, including input and output circuit means, at least one radio frequency amplifier circuit means having input and output circuit means, electrical circuit means for connecting in order said oscillator circuit means, said frequency doubler circuit means, and said radio frequency amplifier circuit means in cascade, and antenna circuit means connected to said output circuit means of the last said radio frequency amplifier stage.

3. A pulsed carrier radio transmitter beacon comprising a source of direct current potential, a radio frequency oscillator circuit means including output circuit means and an oscillator transistor device having at least base, emitter, and collector electrodes for producing a radio frequency carrier signal, the series combination of a resistor and two silicon diodes connected across said source of direct current potential for providing a substantially constant bias potential upon said base electrode, a modulator circuit means comprising a transistor device having at least base, emitter, and collector electrodes, the emitter-collector circuit of which is connected in series with the base electrode of said oscillator transistor and said source of direct current potential for keying said radio frequency oscillator circuit, a modulator circuit control circuit means including input and output circuit means comprising a variable frequency free-running multivibrator device of the type which oscillates at a frequency as determined by the magnitude of the potential signal level applied to said input circuitry thereof for determining the "on" time of said modulator circuit, electrical circuit means for connecting said modulator circuit control circuit output circuit means to the base electrode of said modulator circuit transistor device, potential-signal-generating circuit means including output circuit means for repeatedly producing a periodic substantially linearly variable potential signal the magnitude of which changes substantially linearly over each period for producing the frequency-determining potential for said modulator circuit control circuit means, electrical circuit means including an impedance matching interstage for connecting said potential-signal-generating circuit output circuit means to said modulator circuit control circuit input circuit means whereby the frequency of said modulator circuit control circuit multivibrator device is varied over a predetermined range during each period of said substantially linearly variable potential signal, a frequency doubler circuit means, including input and output circuit means, at least one radio frequency amplifier circuit means having input and output circuit means, electrical circuit means for connecting in order said oscillator circuit means, said frequency doubler circuit means, and said radio frequency amplifier circuit means in cascade, and antenna circuit means connected to said output circuit means of the last said radio frequency amplifier stage.

4. A pulsed carrier radio transmitter beacon as described in claim 3 in which said frequency doubler circuit means comprises a transistor device, means for resonating the inductive input component to a specific frequency, and a coil included in the output circuit means tuned to resonate at a frequency twice that of said input frequency.

5. A pulsed carrier radio transmitter beacon comprising a source of direct current potential, a radio frequency oscillator circuit means, including input and output circuit means, for producing a radio frequency carrier signal, a modulator circuit means, including input and output circuit means, for keying said radio frequency oscillator circuit, electrical circuit means for connecting said modulator circuit means output circuit means to the input circuit means of said radio frequency oscillator circuit means, electrical circuit means for connecting said modulator circuit means output circuit means to said source of direct current potetial, a modulator circuit control circuit, including input and output circuit means, for determining the "on" time of said modulator circuit means, electrical circuit means for connecting said modulator circuit control circuit output circuit means to the input circuit means of said modulator circuit means, potential-signal-generating circuit means, including input and output circuit means, for controlling the operation of said modulator circuit control circuit means by repeatedly producing a periodic substantially linearly variable potential signal the magnitude of which changes substantially linearly over each period for producing the frequency-determining potential for said modulator circuit control circuit means, electrical circuit means for connecting said potential-signal-generating circuit input circuit means to said source of direct current potential, electrical circuit means for connecting said potential-signal-generating circuit output circuit means to said modulator circuit control circuit input circuit means whereby the frequency of said modulator circuit control circuit is varied over a predetermined range during each period of said substantially linearly variable potential signal, a frequency doubler circuit means, including input and output circuit means, at least one radio frequency amplifier circuit means having input and output circuit means, electrical circuit means for connecting in order said oscillator circuit means, said frequency doubler circuit means, and said radio frequency amplifier circuit means in cascade, and antenna circuit means connected to said output circuit means of the last radio frequency amplifier stage.

References Cited by the Examiner

UNITED STATES PATENTS

| | | | |
|---|---|---|---|
| 3,022,418 | 2/1962 | Smyth et al. | 325—105 |
| 3,068,415 | 12/1962 | Johnson | 325—104 |
| 3,108,223 | 10/1963 | Hunter | 325—105 |
| 3,174,103 | 3/1965 | Monroe | 325—105 X |
| 3,246,257 | 4/1966 | Evalds et al. | 331—109 |

JOHN W. CALDWELL, *Primary Examiner.*